Jan. 4, 1938.    F. L. O. WADSWORTH    2,104,215
METHOD AND APPARATUS FOR FEEDING MOLTEN GLASS
Filed March 21, 1934    3 Sheets-Sheet 2
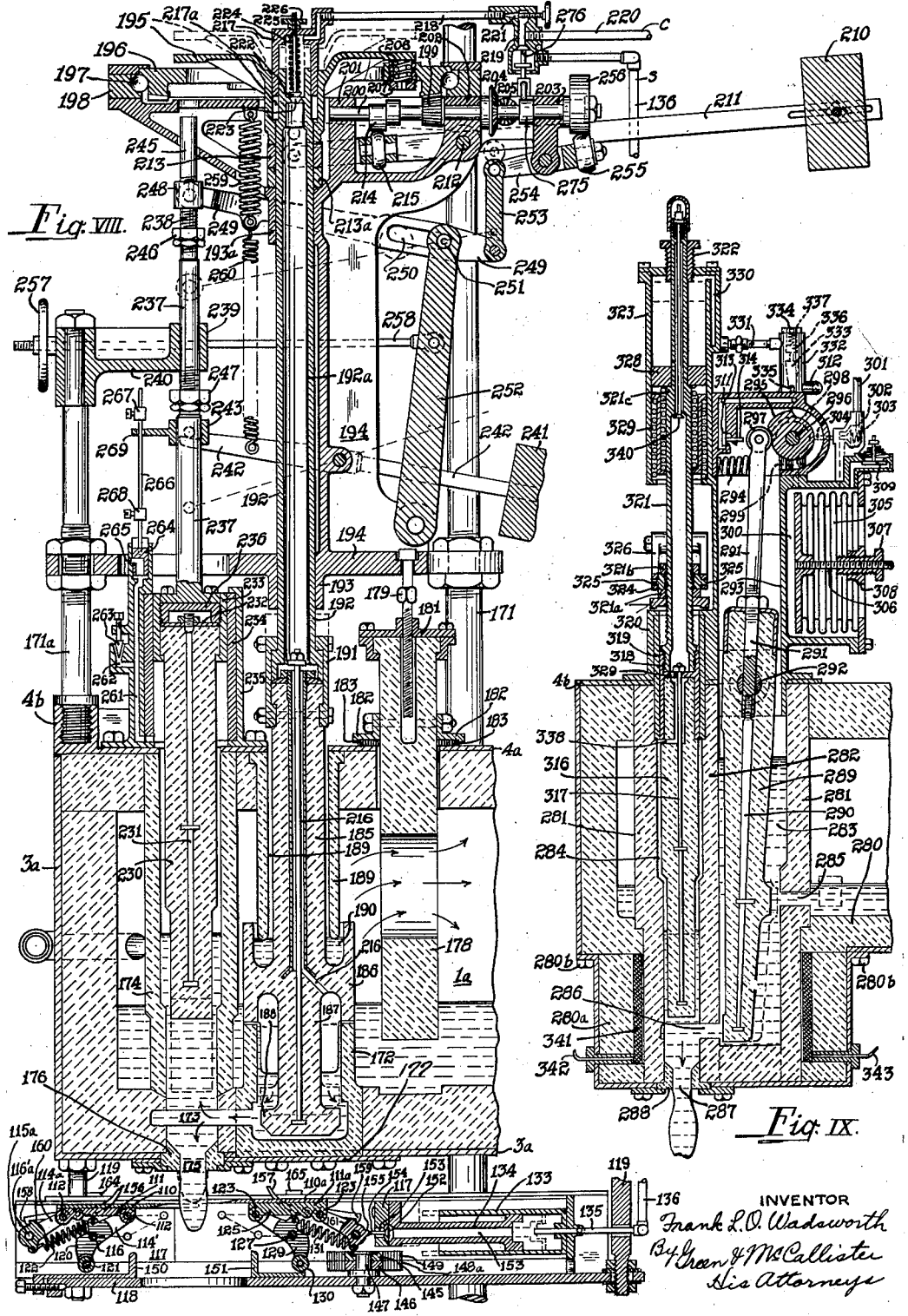
Fig. VIII.
Fig. IX.
INVENTOR
Frank L. O. Wadsworth
By Gran & McCallister
His Attorneys

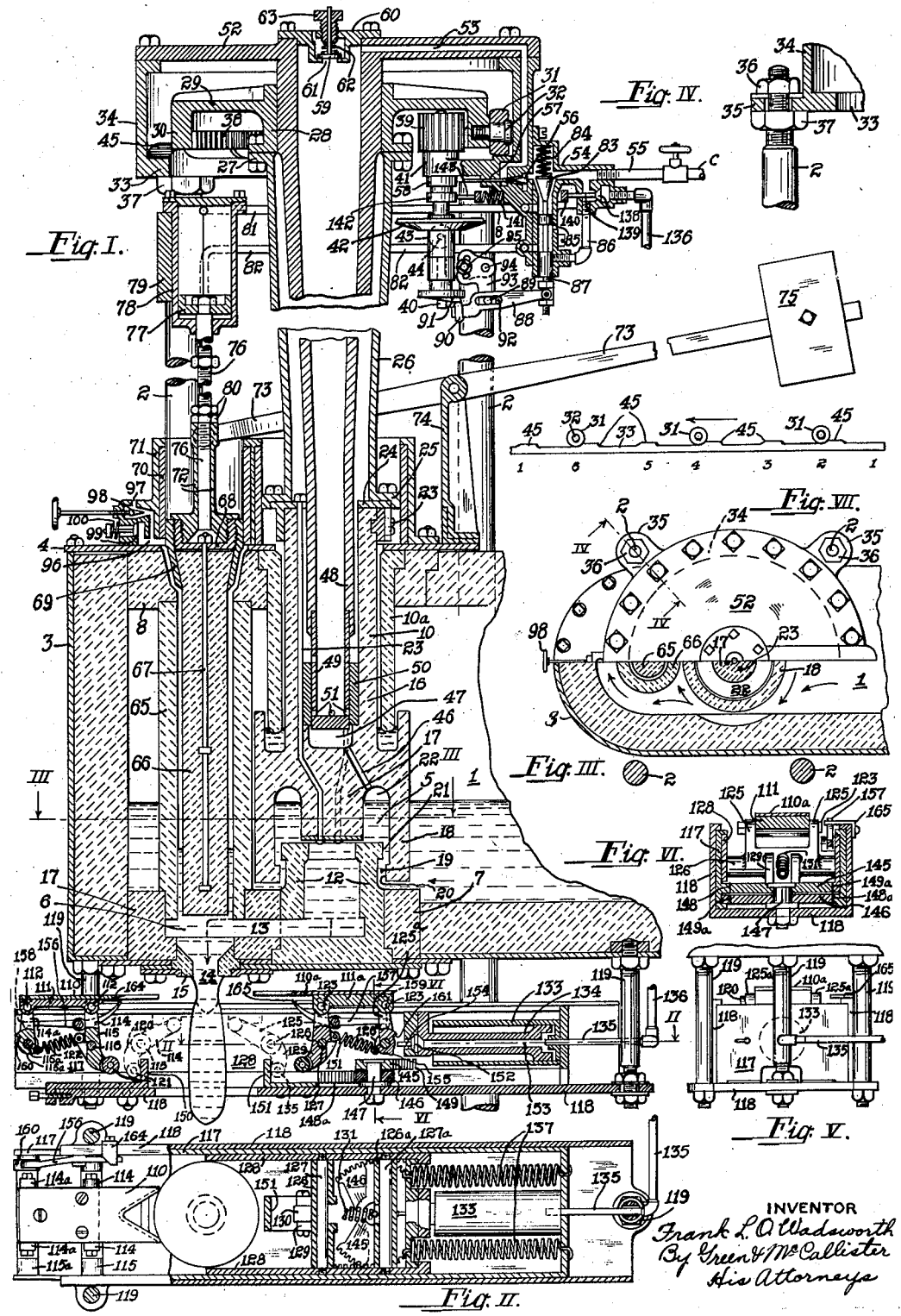

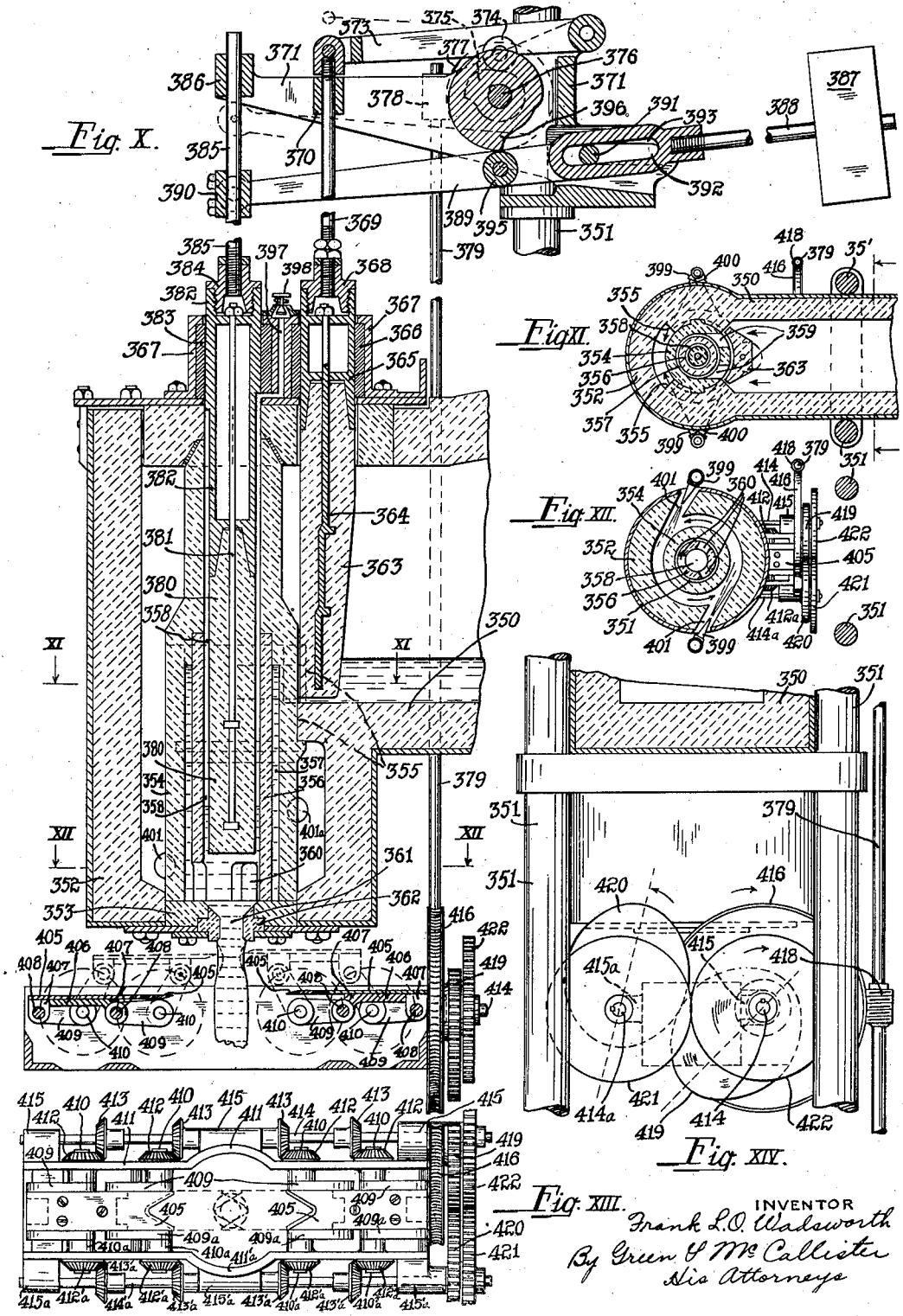

Patented Jan. 4, 1938

2,104,215

UNITED STATES PATENT OFFICE 2,104,215

METHOD AND APPARATUS FOR FEEDING MOLTEN GLASS

Frank L. O. Wadsworth, Pittsburgh, Pa., assignor to Ball Brothers Company, Muncie, Ind., a corporation of Indiana Application March 21, 1934, Serial No. 716,626

24 Claims. (Cl. 49—55)

This invention relates to the art of feeding molten material from a continuous source of supply, and more specifically to improvements in the method and apparatus for feeding molten glass in a continuously moving and pulsating stream, for the purpose of forming a regularly recurrent series of enlarged stream sections, having a predetermined volume and shape, which are adapted to be cut off in succession from the said stream and delivered to the molds of a forming machine at a maximum rate of speed with a minimum loss of heat.

One of the important objects of my invention is the delivery of a continuously flowing stream of molten glass through a suitable orifice, under a relatively high gravity pressure which is periodically supplemented by another single acting downwardly applied force, for the purpose of recurrently swelling the outflowing stream, and thereby producing a succession of enlarged sections that are connected by intervening "necked" portions of lesser diameter (formed by the gravity pressure alone), without at any time subjecting the flowing material to any externally applied retarding or retracting action.

Another object of this invention is to provide a forced flow feeder of the above described type, which may be operated effectively at high speed, and which will not interrupt, or interfere with the continuous discharge of glass from the delivery orifice between the intervals of forced flow, as distinguished from gravity flow, and which will, therefore, eliminate the loss of time and the resultant decreased rate of discharge that accompanies such an interruption, or interference with the gravity flow in all forced flow feeders known to me.

Still another object of these improvements is the provision of a single action forced flow feeder in which the material above the flow orifice is always subjected to an extrusion force of periodically varied intensity that will produce a pulsating discharge of the molten material at alternately accelerated and decelerated velocities of flow, and thereby form a regularly recurrent series of "sausage shaped" stream sections of definitely controllable weight and contour.

A further object of this invention is to provide means for producing an uninterrupted discharge of molten glass, from a continuous source of supply, by the combined complementary action of gravity and of a single action plunger which is periodically forced downward to accelerate and supplement the gravity flow through the delivery orifice, and is lifted on and with the oncoming current of glass from the source without exerting any retardation of the continuous gravity outflow through the orifice.

An additional object of my present improvements is to provide a single action or uni-directional plunger feeder in which the glass is delivered to the orifice at a rate greater than it can be discharged therethrough, and under sufficient pressure to "float" the plunger, which is periodically forced downwardly to aid gravity in extruding glass from the orifice, and accelerating the flow therethrough, and is then allowed to move back to its upper position, under the flotant action of the glass without exerting any retracting or lifting effect on the molten material in which it is immersed.

Still another object of this invention is to provide means for severing the stream, at the points of reduced section, into a series of mold charges, without interfering with or retarding the flow through the orifice during the severing operation, and with the minimum chilling and distortion of the portion of the stream engaged by the severing elements.

These and other objects which will hereinafter be made apparent to those skilled in this particular art, are accomplished by means of this invention, several embodiments of which are illustrated in the accompanying drawings, wherein:

Figure I is a view, in vertical section through the flow orifice, of an improved apparatus for carrying out my process of feeding molten glass;

Fig. II is an enlarged sectional view taken on line II—II of Fig. I;

Fig. III is in part a top plan view of the apparatus, and in part a section taken on line III—III of Fig. I;

Fig. IV is a partial sectional view taken on line IV—IV of Fig. III;

Fig. V is a view in end elevation of the shear mechanism;

Fig. VI is a sectional view taken on line VI—VI of Fig. I;

Fig. VII is a developed view of the means for raising and lowering the flow controlling member;

Fig. VIII is a view, in vertical section taken through the flow orifice, of another form of apparatus embodying my invention;

Fig. IX is a view in vertical section taken through the flow orifice of an apparatus illustrating still another exemplification of this invention;

Fig. X is a view in vertical section taken through the flow orifice of a fourth form of apparatus for practicing my invention, and further illustrates a second form of shear mechanism therefor;

Fig. XI is a section taken on line XI—XI of Fig. X;

Fig. XII is a section taken on line XII—XII of Fig. X;

Fig. XIII is a top plan view of the shear mechanism, shown in Fig. X; and

Fig. XIV is a view in side elevation of this same shear mechanism showing the driving gears thereof.

Referring to the drawings in detail, I have shown in Figs. I to VII, inclusive, a mechanism, for feeding molten glass in accordance with my improved procedure and also a novel shear mechanism for severing the molten stream into a succession of mold charges. The body of molten material from which the continuous stream of glass is to be fed is contained in a forehearth or "boot" 1 which extends out from the front of a suitable melting furnace or tank (not shown), and which is supported on each side thereof by upright posts 2—2—2—2. The glass in the forehearth 1 is preferably heated by auxiliary burners, as is usual practice, and flows by gravity into an annular chamber 5 in the lower end of a vertically movable refractory member 10 that surrounds and covers an open ended cylinder 12 which is seated in a removable floor block 7, and which is periodically placed in communication with the chamber 5 by the raising of member 10. The glass then passes from the interior of the cylindrical sleeve 12 to a second cylindrical opening 6 in the forward end of the floor block 7, from which it is delivered to the discharge orifice 14 in the lower face of this block.

In order to agitate and stir the glass in the forehearth chamber, for the purpose of maintaining the glass therein at an even and uniform temperature, and for the further purpose of controlling the flow of glass from the forehearth into the chamber 5 and thence into the sleeve 12, the refractory member 10 is so mounted as to be capable of both rotary and reciprocatory movement, and is provided with a central boss or plug 17 which is adapted to seat over and substantially close the top of the sleeve 12 when the member 10 is in its lowermost position. It is also provided with an annular skirt 18, which surrounds the outer surface of the sleeve 12, but which is spaced therefrom to form a glass passageway 19 therebetween. The lower end of this skirt 18 terminates in an inwardly projecting flange 20 which, when the member 10 is raised, cooperates with an outwardly projecting flange 21 on the top of the sleeve 12, and substantially closes the annular passageway 19 whereby a quantity or quota of glass is periodically trapped within the chamber 5.

The member 10 extends through a sleeve 10a which is suitably mounted on the roof of the boot and extends downwardly into the forehearth terminating in a recess of the member 10 which is filled with suitable liquid, thereby forming a seal which prevents the heat in the forehearth from escaping through the roof adjacent the member 10. The upper end of the member 10 is connected, by means of bolts 23, extending through the member, to a collar 24 which is bolted to the lower end 25 of a tapered sleeve 26 whose upper end 27 is, in turn, rigidly connected to the hub 28 of an internal spur gear 29. The gear member 29 is supported on three spaced rollers 31 which are mounted on stud bolts 32 that are threaded into the rim of the gear, and which ride on the upper surface of a track flange 33 projecting inwardly from a fixed annular sleeve 34. This sleeve 34 is provided with a series of apertured lugs 35 through which the threaded ends of the upright posts 2—2—2—2 extend. In order that the sleeve 34 may be adjusted horizontally on the posts 2, the apertures in the lugs 35 are of greater diameter than the diameter of the threaded ends of the posts (Fig. IV); and in order that the sleeve may be either tilted or raised and lowered—to properly position the lower end of the member 10 relative to the sleeve 12—the lugs 35 are adjustably locked in position on the posts, by upper and lower nuts 36—37.

In order to rotate the member 10 the internal gear teeth 38 are engaged by a pinion 39 mounted on the upper end of a vertical shaft 40 which is journaled in a bearing boss 41 on the fixed sleeve 34. The shaft 40 is driven by a bevel gear 42 which meshes with a pinion 43 on a shaft 44 that is continuously rotated by a suitable motor (not shown). In order to raise and lower the revolving member 10 at predetermined points in its rotation—and thereby open and close the top of the sleeve 12, and concurrently close and open the passageway 19—the surface of the track flange 33 is provided at uniformly spaced intervals with a series of raised portions 45 which, as the rollers 31 pass thereover, impart the desired up and down movement to the member 10 (Fig. VII).

In order to assist the gravity flow of the glass from the chamber 5 into the sleeve 12, and thence through the passageway 13, when the member 10 has been raised I may at that time, apply a fluid pressure to the surface of the glass in said chamber. In the form of construction here illustrated, this is accomplished by introducing compressed air (or steam) through a series of passageways 46, in the member 17, that communicate with a central longitudinal opening 47 therein, into which a tube 48 having a closed end 49 extends. The closed end 49 of the tube, which is made of a suitable high heat resisting alloy such as nichrome, is journalled in a graphite bearing sleeve 50 mounted in the opening 47, and is provided with a series of openings 51 which are closed by the bearing 50 when the member 10 is in its lowermost position, and which are opened to establish communication between the interior of the tube 48 and the passageways 46—when the member 10 is in its raised position.

The upper end of the tube 48 extends through the hub 28 of the member 29 and forms an axle bearing therefor; and is provided with an enlarged head 52 which is bolted to the top of the sleeve 34. Compressed air or steam is periodically admitted to the interior of the tube 48 through a passageway 53 leading to a valve box 54 that is connected to a suitable source of fluid pressure by a pipe 55.

The passage of air or steam from the valve box 54 to the passageway 53 is controlled by a needle valve 56 which is normally held in engagement with its seat—to close the passageway 53—by the pressure of the fluid against the head of the valve. To unseat the valve 56, and open the passageway 53, the valve stem 57, is engaged by a cam 58 secured to the shaft 40, so that as the shaft turns, this cam will periodically move the valve to the right—against the fluid pressure in the box 54—and permit the air (or steam) to flow through the passageway 53 to the interior of the tube 48. The cam 58 is timed to operate and open the valve 56 just before the member 10 has been lifted to its upper position; so that the fluid filling the interior of the tube 48 will flow into the opening 47 and through the passageways 46 into the chamber 5, as soon as the ports 51 have been uncovered or opened by this lifting movement.

To prevent the air within the tube 48 from exceeding a predetermined pressure, a check valve 59 is mounted in a cap plate 60 which covers the upper end of the tube 48. This valve 59 covers a vent port 61, and is normally held in its closed position by a spring 62 interposed between the valve 59 and an adjustable set screw 63, carried by the cap 60. From this construction it is apparent that the spring can be so adjusted, by turning the screw 63 that the valve 59 will open when the pressure in the tube 48 exceeds any predetermined or preadjusted value.

The passageway 13, which connects the chamber in the cylindrical sleeve 12 with the opening 6 is in the front end of the floor block 7, is rectangular in form, and has a width substantially equal to the enlarged internal diameter of the lower end of the sleeve chamber. The lower end of the cylindrical opening 6 is reduced in size to receive a removable flow ring bushing 15 which controls and determines the shape and size of the delivery orifice 14; and it is apparent that the cross sectional area of this orifice is materially less than that of any of the connecting passageways and chambers through which glass is supplied to it. When the member 10 is raised to its upper position, to substantially shut off the flow of glass into the chamber 5 and to concurrently put this chamber in communication with the interior of the sleeve 12, the glass will, therefore, flow into the cylindrical opening 6—under either the joint action of gravity and of the pressure in the chamber 5, or under the action of gravity alone—more rapidly than it can escape from the discharge orifice 14.

For the purpose of confining and segregating the supply of molten material in the space above the orifice 14, the upper end of the cylindrical chamber 6 is shut off from the surrounding glass adjacent thereto by a tubular member 65, which extends upwardly to the full height of the forehearth chamber and is clamped in position between the top of the floor block 6 and the lower face of the roof block 8 by the pressure of a cover plate 4, that is bolted down to the metal frame 3 of the forehearth assembly. This tubular member 65 surrounds a reciprocable plunger member 66, which extends through an opening in the roof block 8, and which is detachably clamped to a cup-shaped metal head 68 by means of a bolt 67, that is embedded in the body of the refractory plunger 66, and a conical threaded collar 69 that embraces the upper end of the said plunger member. The outer surface of the collar 69 is slidably engaged in a graphite bearing sleeve 70 which is mounted in a metal housing 71 that is bolted down on the cover plate 4; and the head 68 is detachably connected to the flanged lower end of a tubular rod 72. The upper end of the rod 72 is flexibly connected to the end of an arm 73 which is pivotally supported intermediate of its length, on a bracket 74 extending upwardly from the forehearth roof (cover plate 4); and which carries an adjustable weight 75, that can be set to counterbalance the weight of the plunger, and overcome any frictional resistance to its movement, so that the reciprocable member 66 will float freely in the glass within the tubular sleeve 65.

In order to periodically impose a supplemental expelling or extrusive pressure on the segregated mass of glass in the chamber opening 6 and the tubular sleeve 65, and thus accelerate the flow through the orifice 14, means are provided for periodically forcing the floating plunger 66 downwardly, at the time when the rotating valve member 10 is depressed to prevent a return flow of glass into the chamber 5. These means comprise a rod 76 which has one end slidably mounted in the tubular rod 72, and which has the other end connected to a piston 77 in a cylinder 78 that is supported by a crosshead 79 extending between two of the upright posts 2—2. When the plunger 66 is to be moved downwardly, to expel the glass in the sleeve 65, an elastic fluid under pressure, such as compressed air, is introduced into the top of the cylinder 78, and the resultant movement of the piston 77 and piston rod 76 brings the adjustable lock nuts 80 on the piston rod, into engagement with the upper end of the tubular rod 72, and communicates the movement of the piston 77, to the plunger 66. The range of the downward stroke of the plunger may be readily adjusted and controlled by raising and lowering the nuts 80 on the rod 76.

After the downward movement of the plunger 66 has been completed (by the engagement of the piston 77 with the bottom of the cylinder 78), compressed air is admitted to the lower end of the cylinder, and the piston rod nuts 80 are raised out of engagement with the rod 72, thus leaving the plunger 66 to float freely in the glass surrounding its lower end. The motive fluid for actuating the piston 77 is introduced to the top and bottom of the cylinder 78 through pipes 81 and 82, which lead from the cylinder to the valve box 54, that is constantly supplied with air under pressure through the pipe 55; and the alternate admission and exhaust of air through the said pipes is controlled by a three-way valve 83 which is mounted in the box 54 and normally held in its lowermost position by a coil spring 84 interposed between the upper head of the valve and the top of the housing 54.

When the valve 83 is in its lowermost position, the pipe 81 is connected to atmosphere through a port 85 in the box 54 and the pipe 82 is connected, by the pipe 86, to the supply pipe 55, so that the piston 77 is normally held in the upper end of the cylinder 78. The valve 83 is raised to its upper position—to connect the pipe 81 to the source of air and the pipe 82 to atmosphere—by a stem 87 which is flexibly connected to the end of a lever 88, pivotally mounted on a pin 89 and provided with a roller 90 which is engaged by a face cam 91 on the shaft 40. In order to control the throw of the valve 83 the pin 89, which extends through a slot 92 in the arm 88, is carried on a rocking member 93 that is pivoted, at 94, to one of the bearing boxes of the shaft 40, and is held in position relative thereto by a nut 95. By turning the member 93 about its pivot 94 it is apparent that the pin 89 may be shifted back and forth in the slot 92 and the degree of opening of the valve 83 may thus be readily controlled.

The interior of the sleeve 65, is connected at its upper end to a small chamber 96, in the housing 71, which opens to atmosphere through a port 97; and in order to secure some compression of the air within the sleeve, on the downward movement of the plunger 66—and thus aid the plunger 66 in expelling the glass therefrom—a manually operated needle valve 98 is interposed in the passage leading to the port 97, for the purpose of throttling the escape of air from the sleeve. To prevent any material rarefication of the partially trapped air, on the reverse upward movement of the plunger, I provide a second valve 99 which is normally held in closed position by an adjustable spring 100, and is adapted to automatically open to atmosphere when the pressure in the sleeve drops below the predetermined or preadjusted value.

In the operation of the apparatus, the shaft 40 is continuously driven through the gear 42 and the member 10 is continuously rotated by the pinion 39 and the gear 38 for the purpose of keeping the glass in the forehearth in continuous circulation and preventing localized changes in temperature in the parent body of molten material.

When the parts are in the position shown in Fig. I, during the operation of the apparatus, the plunger 66 has just completed its downward stroke, and the member 10 is just on the point of being raised to establish free communication between the accumulation chamber 5 and the passageway 13. As the plunger completes its downward stroke, the cam 91 releases the lever 88, and the valve 83 is moved down by the spring 84, thereby admitting motive fluid to the lower end of the cylinder 78 and lifts the piston 77, to disengage the piston rod nuts 80 from the plunger rod 72. When the revolving valve member 10 is lifted by the engagement of the rollers 31 with the raised portions 45 of the cam track 33, the flange 20 is moved into overlapping relationship with the flange 21—thereby shutting off any material flow of glass from the forehearth into the chamber 5—and the ports 51 in the tube 48, are concurrently uncovered to establish communication between the interior of this tube and the chamber 5. This permits the compressed air, which has already been admitted to the tube 48 by the opening of the valve 56 (supra), to enter the chamber, and subject the surface of the glass therein to a predetermined pressure (as controlled by the "blow off" valve 59), that assists gravity in forcing the glass through the passageway 13 and up into the sleeve 65. As the level of glass rises in the interior of this sleeve, the counterbalanced plunger 66 is floated to its upper position; without exerting any retarding or retractive effect on the glass which is then flowing through the delivery orifice 14 under the influence of gravity. As soon as the required quantity of glass has thus been transferred from the chamber 5 to the sleeve chamber (65), the rollers 31 ride off the cam projections 45 and the member 10 is allowed to drop to its lower position; thus substantially closing the top of the sleeve 12, and concurrently opening the passageway 19, so that glass is again permitted to flow from the forehearth 1 into the chamber 5.

As soon as the revolving member 10 has returned to its lower position, the cam 91 engages the roller 90 and rocks the arm 88 to lift the valve 83; thereby connecting the pipe 81 to the source of compressed air and the pipe 82 to atmosphere. The resultant admission of compressed air to the top of the cylinder 78, moves the piston 77 downwardly and again depresses the plunger 66, thereby accelerating the flow through the delivery orifice 14 and swelling or expanding the stream issuing therefrom. Since the top of the sleeve 12 is closed, during the downward movement of the plunger 66, it is apparent that the glass in the sleeve 65 cannot then be forced back into the forehearth 1; and that the full extrusion effect of the descending plunger will be exerted in supplementing the action of gravity during this period of accelerated flow.

On the completion of the downward stroke of the piston 77 the cam 91 again releases the roller 90, and the spring 84 lifts the valve 83 to initiate another cycle of action.

From the foregoing description, it is apparent that a substantial head of glass is always maintained, in the interior of the connected sleeves 12—65, which will induce a continuous gravity discharge of the molten material from the orifice 13; and that this discharge is periodically accelerated by the forced downward movement of the plunger 66. Since the plunger 66 is floated upwardly by the glass as it rises in the sleeve 65, it exerts no arresting or retarding influence on the continuous gravity flow through the orifice, and I thus produce a continuously flowing stream, of alternate accelerated and decelerated velocities; and since the stream is increased during the period of accelerated flow, I produce a stream having a series of regularly recurrent enlarged sections, connected by portions of reduced diameter. The portions of reduced diameter are the result of a "natural necking" occurring in the stream at the time of the decelerated flow, and not of any positive retardation or retraction of the flow from the orifice.

Another feature of my invention resides in a shear mechanism for periodically severing the glass stream, at the points of reduced cross section, which will not check or interfere with the flow of the molten material, during the time of severance, but which may, on the contrary, be so operated as to actually assist this flow, and also substantially accelerate the delivery or removal of the successively severed sections to the receiving molds or receptacles in which they are subsequently fabricated.

The shear mechanism illustrated in Figs. I, II, V, VI, and VIII comprises a pair of opposed shear blades 110—110a, of the usual reentrant V or "cat's eye" cutting edge type, which are respectively secured to the upper faces of the members 111—111a. Each of the blade supporting members 111—111a is pivotally attached (at 112 or 123) to the upper ends of a dual pair of parallel link arms (114—114a and 125—125a), which are respectively secured to bearing sleeves (115—115a and 126—126a) that are rotatably mounted on cross shafts 116—116a and 127—127a. The ends of the shafts 116—116a are secured in the sides of a U-shaped member 117 which is slidably mounted between the sides of a box frame 118 that supports the shear mechanism, as a whole, and which itself is adjustably supported on the rods 119 depending from the bottom plate of the forehearth 1. The ends of the shafts 127—127a are secured to the sides of a second U-shaped member 128 which is slidably mounted within the legs of the U-shaped member 117.

Each of the sleeve members 115 and 126 is provided with a pair of spaced arms (120 and 129) which extend downwardly therefrom, and which carry a roller (121 and 130), the purpose of which will be hereinafter described. Each pair of links (114—114a and 125—125a) is normally held in a substantially vertical position (as shown in full lines in Fig. I) by means of tension springs (122 and 131) whose ends are attached thereto on opposite sides of their shaft supports (116—116a or 127—127a).

When the shear blades 110—110a are to be closed, the U-shaped members 117 and 128 are moved in opposite directions on the frame 118, by means of a cylinder-piston assembly 133—134, which is disposed between the crossheads of the U-shaped members 117—128, with the outer end of the cylinder 133 attached to member 117 and the inner end of the piston 134 attached to the U-shaped member 128. The cylinder and the piston are concurrently moved in opposite directions by a suitable motive fluid, such as compressed air, which is admitted to the cylinder through a pipe 135 slidably mounted in the connected heads of the U-shaped member 117 and the cylinder 133, and connected to a pipe 136 leading from the valve housing 54. The cylinder and piston members 133—134 are normally held in their retracted or closed position by means of coil springs 137—137 whose opposite ends are attached to the crossheads of the U-shaped members 117 and 128.

When it is desired to sever the stream of molten glass flowing through the orifice 14, compressed air is admitted into the line 135—136, and delivered to the cylinder 133, by opening a needle valve 138 in the valve housing 54. This valve 138 is provided with a stem 139, which is connected to a yoke 140 that straddles the housing 54 and is normally held in the full line position of Fig. I by a spring 141 positioned between the outer end of the yoke and the valve housing. The valve is opened, or unseated at the desired time, by a cam 142, which is mounted on the cam shaft 40, and which engages with a finger 143 that is attached to the valve stem yoke 140.

As soon as the compressed air is introduced into the cylinder 133, the piston 134 and the head of the cylinder are concurrently moved in opposite directions, and carry with them the U-shaped members 117—128. These moving parts are constrained to travel at the same speed relative to the supporting frame by a pair of segmental control pinions 145—146 which are rotatably mounted, one above the other, on a stud bolt 147 that is rigidly secured in the bottom plate of the frame 118; and are arranged to engage with rack bars 148—148a and 149—149a that are respectively attached to the U-shaped members 117 and 128. The pinion 145 engages on one side with the rack bar 148 on the member 117 and on the other side with a rack bar 149 on the member 128; while the pinion 146 engages on the opposite sides with the rack bar 148a on the member 117, and with the rack bar 149a on the member 128 (Fig. VI).

To impart a "dropping" movement to the shear blades 110—110a so that they may travel with the molten material during the severing operation—stops 150—151 are adjustably mounted on the frame 118 and are so positioned as to engage the rollers 121—130, as the parallel supports 117 and 128 move in opposition to each other, and bring the cutting edges into contact with the surface of the flowing stream. As soon as this engagement occurs, the continued movement of the frames 117 and 128 rock the link arms 114— 114a and 125—125a, in opposite directions and cause the shear blades to move downwardly as they pass into and through the stream of glass (as indicated in dotted lines in Fig. I). The ratio between the transverse and axial movement of the cutting edges, during this severing operation, can be varied within wide limits by altering the relation between the length and the angular inclination of the link arm elements 112—123, 120—129, and also by changing the position of the stops 150 and 151; but I prefer, in most cases, to so proportion and adjust these relationships that the shear blades will pass through the flowing stream at an angle of approximately 45° to the axis thereof.

In order to exhaust the air from the cylinder 133 and permit the springs 137 to return the support members 117—128 to their original position, after the severing operation has been completed, I provide a vent valve 152 which is mounted in the crosshead of the frame 128, and which serves to normally close the outer end of the passageway 153 in the tubular piston member 134. This valve 152 is held in its closed position by the pressure of the fluid in the cylinder 133; and is adapted to be opened by the engagement of the valve stem 154, with a lug 155 on the link arm 125a, when the latter has been rocked to such position—by the inward movement of the correlated parts 128—134—as to completely close the shear blades 110—110a. It is desirable to hold the shear blades 110—110a in their depressed position, while they are being retracted, and thus prevent them from coming into contact with the oncoming end of the severed stream; and in order to effect this result I provide a pair of locking dogs 158—159 which are carried by arms 156—157 that are pivotally mounted on the members 117—128 and which engage respectively with lugs 160—161, on the sleeves 115a and 126a when the link arms 114a and 125a have been rocked inwardly to the shear closing position, and thus prevent the return springs 122—131 from acting on these links until the dogs 158—159 have been released. When the blades are fully retracted, the upturned ends of the arms 156—157 are engaged by angle clips 164—165, secured to the sides of the frame 118, and the dogs or latches 158—159 are disengaged from the lugs 160—161, thus permitting the springs 122—131 to return the parallel link systems 114—114a and 125—125a to their original position.

Briefly restated, the operation of the shear mechanism is as follows: When the glass is issuing through the orifice under the influence of gravity alone—or under the decelerated velocity of flow that occurs at the end of the down stroke of the plunger—the cam 142 opens the valve 138 and admits compressed air to the cylinder 133. As the air enters the cylinder and passes through the hollow piston 134, it closes the valve 152 and the piston and the cylinder are concurrently moved in opposite directions, at the same rate of speed, thus advancing the shear blade carriages 117—128 toward the stream flowing through the orifice. This movement brings the rollers 121—130 into engagement with the stops 150—151 at a time when the shear blades are about to enter the flowing stream; and the further movement of the members 117—128 causes the parallel link systems 114—114a and 125—125a to rock inwardly, on their shaft supports 116—116a and 127—127a, thus imparting a concurrent transverse and downward movement to the shear blades 110—110a as they cut through the stream. At the completion of this cutting movement the dogs or latches 158—159 drop over the cam lugs 160—161 and lock the parallel link systems and the supported shear blades to their lowermost closed position.

At the same time that the locking latches 158—159 engage the lugs 160—161, the lug 155 engages the valve stem 154 and opens the valve 152, to connect the interior of the cylinder 133 to atmosphere, and permit the spring members 137 to return the shear blade carriages 117—129 to their original relationship (Fig. I). At, or near, the end of this return movement, the upturned ends of the arms 156—157 are engaged by the clips 164—165, and the locking elements 158—160 and 159—161 are disengaged, to allow the springs 122—131 to retract the link arms and the connected shear blade supports to their initial raised position, in readiness for the next severing operation. The time relationship of these successive return movements will be readily understood by referring to Fig. VIII, which shows the various parts of the mechanism in the positions which they occupy at an intermediate point in the backward travel of the carriages 117—128. It will of course be understood that at some time prior to the release of the locking elements (158—159) the revolving cam 142 has permitted the spring 141 to close the valve 138 and thus shut off the flow of compressed air to the cylinder connections 136—135.

Fig. VIII illustrates another form of apparatus for feeding glass in accordance with my improved method. In the construction there shown, the parent supply body of molten glass is contained in a forehearth 1a, which extends outwardly from the front of a melting tank (not shown), and is enclosed in a metal frame 3a, which is supported on a pair of upright posts 171. The glass in the forehearth just flows by gravity into the top of a sleeve 172—which extends upwardly from the bottom of the forehearth, and which terminates below the normal level of glass therein—and then through a wide rectangular passageway 173, leading to an enlarged opening in the floor of the forehearth. This opening is positioned over, and is in constant communication, with a delivery orifice 175 in the removable flow ring or bushing 176; and is closed off from the supernatant glass in the bottom of the forehearth by an upright sleeve 174, which extends up through the forehearth roof, and is secured in position by the metal roof plate 4a. The sleeve 172 is, on the other hand, inserted through the bottom or floor of the forehearth chamber and is removably held in place therein, by a plate 177, which is bolted against the metal frame 3a.

To control the flow of glass from the forehearth 1a into the sleeve 172, and also to stir and agitate the glass for the purpose of eliminating localized irregularities of temperature, a refractory member 185 is rotatably and reciprocably mounted above the sleeve 172, and is provided with an annular head 186, which is of substantially the same diameter as the top of the sleeve 172, and also with a control plug 187 which projects downwardly into the interior of the sleeve and terminates in an enlarged head 188 adjacent the bottom thereof.

The upper portion of the rotatable member 185 is surrounded by a stationary guard sleeve 189, which is supported in the forehearth roof and which has its lower end immersed in a body of molten metal that is retained in an annular channel 190, in the head 186;—thus forming a liquid seal which does not interfere with the free movement of the members 185—186—187, but which prevents any gases of combustion from escaping from the forehearth through the free space between the concentric members 185 and 189.

The member 185 extends above the top of the sleeve 189 and is connected, by means of a split collar 191, to the lower flanged end of a tubular shaft 192, which is slidably journaled in bearing boxes 193 and 193a that are carried by a heavy I-shaped bracket frame 194. The upper end of the tube 192 is keyed to a flanged head 195, which is adapted to rest on, and be frictionally driven by, an annular bevel gear 196, that is supported on ball bearings 197, and is continuously rotated by a suitable motor (not shown), through the train of bevel gear and countershaft elements 199—200—204—205. The ball race 198 and the bearing boxes 201—202—203, for the countershaft 200, are all carried on, or form a part of, the upper head of the bracket frame 194; and the lower head of this frame is adjustably supported on the two side posts 171—171 of the forehearth assembly, and on a third post 171a, which is rigidly mounted in a threaded boss 4b on the front end of the roof plate 4a; so that by adjusting this frame on its supporting posts, the rotatable members 185—192 and their associated driving elements may all be moved as a unit to bring the parts 186—187—188 into proper operative relationship to the sleeve member 172.

In order to control the frictional driving action of the ring gear 196 on the shaft head 195, a series of spring members 206 are mounted in tubular socket screws 207 which are threaded into inwardly projecting lugs on the ring; and by adjusting these screws the degree of pressure engagement between the springs 206 and the head 195 can be readily varied so as to allow a greater or lesser degree of slip between the driving and driven parts.

The connected members 192—195 are normally held in the raised position, indicated by the dotted lines in Fig. VIII, so as to lift the lower edge of the head 186, above the top of the sleeve 172—by means of a counterweight 210 that is adjustably secured between the outer ends of a pair of turn levers 211, (only one of these appear in the sectional elevation of Fig. VIII), which are fulcrumed at an intermediate point of their length on a cross pin 212 in the upper head of the bracket 194, and are pivotally attached, at their inner ends, to a collar 213 that is loosely mounted on the shaft 192, between the hub of the head 195 and a lower thrust block 213a on the shaft. The driven arm lever system is rocked in a counterclockwise direction—to move the shaft assembly 192—195—213a—185, etc., to the full line positions of Fig. VIII—by a cam 214, on the shaft 200, which periodically engages a roller 215, that is mounted between the lever arms 211. When the raised portion of this cam engages the roller 215, the outer ends of the twin lever arms are moved downwardly, thus raising the weight 210, and bringing the shaft head 195 into engagement with the spring elements 206. From this construction it is apparent that the member 185 is not rotated, when it has been raised to its upper position, to permit the glass to flow from the forehearth into the interior of the sleeve 172, and is only revolved when the member 185—186—187 have been moved down to substantially close the upper end of the said sleeve and thereby cut off communication with the forehearth.

When the member 185—186—187 is in its elevated position, the enlarged head 188 is moved up into the smaller part of the sleeve chamber 172, to throttle and substantially arrest the flow of glass through the passageway 173, while the molten material is flowing by gravity into the annular chamber between the sleeve 172 and the raised members 186—187, and 188, and is rising therein to the same level as the glass in the forehearth. When the member 185 is depressed and the enlarged head is moved down into the larger part of the sleeve chamber (Fig. VIII) in open communication with the interior of the sleeve 172, and the glass stream is permitted to flow freely, into the opening above the delivery orifice 175 and into the lower end of the tubular sleeve 174. At this time the head 195 is in frictional engagement with the gear ring elements 206, and the member 185—186—187 is rotating and stirring the glass in the sleeve chamber and in the surrounding forehearth.

In order to assist gravity in inducing a rapid flow of glass from the sleeve chamber through the passageway 173 and into the sleeve 174, the member 185 is provided with a passage-way 216 leading to the interior of the tube 192, through which compressed air, or any other suitable fluid under pressure, may be introduced into the upper end of this chamber. The fluid under pressure is delivered to the tube 192, through a stationary cup-shaped collar or cap 217, whose skirt is slidably engaged in an annular recess 217a between the upper end of the tubular shaft 192 and the hub of the shaft head 195, and which is connected to a pressure supply conduit 220 by a pipe 218 and a valve box or housing 219 that are mounted on the upper head of the bracket frame 194. The flow of motive fluid, from the housing 219 into the pipe 218, is controlled by a manually operable needle valve 221, and the passage of fluid from the cap 217 to the interior of the tube 192, is further controlled by a valve 222, which is adapted to close a port 223, when the connected members 192—185, etc., are in their raised positions. The valve 222 is normally held in the position shown in Fig. VIII by a spring 224 which surrounds a stem 225 that extends upwardly from the valve, and is threaded through a nut 226 resting on the closed end of the cup 217. The nut 226 is so adjusted that, as the tubular shaft 192 approaches the downward limit of its travel, the port 223 is automatically opened, to permit the compressed fluid to flow into the chamber on the lower end of the member 185; but as soon as this member starts on its upward movement, the valve 222 is seated over the port 223, and traps a small quantity of the fluid in the tubular shaft 192.

The fluid pressure on the surface of the molten material in the closed chamber between the sleeve 172 and the depressed member 186 accelerates the natural gravity flow from the chamber through the passageway 173 into the sleeve 174. The glass, which is delivered during this period to the space above the delivery orifice 175, will be expelled in part from this orifice; but the area of the supply passageway 173 is as much greater than the area of the opening in the flow ring 176, that the molten material will rise rapidly in the sleeve 174, until the level therein is equal to, or substantially higher than that of the glass in the surrounding forehearth. When this desired level is attained the cam 214 permits the member 186—192 etc., to be raised by the action of the counterweight 210, thus shutting off the flow of glass through the passageway 173 and concurrently opening communication between the forehearth chamber and the interior of the sleeve 172.

The sleeve 174 surrounds a plunger 230, made of a suitable refractory material, which is supported on a rod 231 embedded therein that is bolted at its upper end to a plate 232. The upper end of the plunger 230 is also enlarged to engage with a shouldered collar 233, which is formed from some suitable heat resisting alloy, such as nichrome, and which is slidably mounted in an annular refractory bearing 234, (such as graphite), carried in a housing 235 that is bolted down on the top plate 4a of the forehearth. The plate 232 and the collar 233 are both locked in position on the head of the plunger 230 by a threaded cap 236; and this cap is, in turn, bolted to the lower flanged end of a shaft 237 which is slidably engaged by a bearing member 239 that is carried by the post 171a.

In order that the plunger 230 may be "floated" upwardly on the glass flowing into the sleeve 174 through the passageway 173, without exerting any retarding or retracting effect on the outflow of glass through the delivery orifice 175, the weight of the plunger, and the frictional resistance between the sleeve 233 and the bearing 234, is counterbalanced or slightly overbalanced, by a weight 241, which is secured between the inner ends of a pair of twin levers 242 that are fulcrumed on the bracket frame 194, and are engaged at their outer ends with pivot pins on a collar 243 secured to the shaft 237.

In order to periodically depress the plunger 230 and thereby exert a supplemental pressure on the glass in the sleeve 174—to thereby accelerate the flow through the orifice 175—a collar 248 is slidably mounted on a shaft 237, and is pivotally connected to the adjacent ends of a pair of lever arms 249, which are fulcrumed on a cross pin 251 of an angularly adjustable link support 252, that is pivoted on the frame 194; and whose inner ends are flexibly coupled by a link 253 to a second twin arm lever 254 that is also fulcrumed on the frame 194, and is provided with a roller 255, which engages a cam 256 on the shaft 200. The cam 256 is so shaped as to periodically rock the lever 254 in a clockwise direction, and thereby turn the lever arms 249 in the reverse direction, thus moving the collar 248 downwardly. This downward movement of the collar is transmitted to the shaft 237—and thence to the plunger 230—by a pair of lock nuts 246—which can be adjusted vertically on the upper threaded portion 238—of the shaft 237, so as to be engaged by the collar at any desired and predetermined point in its downward travel. The range or extent of the down stroke can also be varied by slotting, as at 250, those portions of the lever arms 249 through which the fulcrum pin 251 passes; and moving the fulcrum pin link support 252 backward or forward, to vary the position of the fulcrum point of the levers.

To vary the position of the fulcrum pin 251, a threaded rod 258 is pivotally attached to the link 252, and has a handwheel nut 257 thereon for moving the link 252. The rod 258 is rotatably supported in an end thrust bearing on the bracket 240. The free upward movement of the plunger assembly can also be controlled and limited by a pair of stop nuts 247, which can be adjusted up and down on the lower threaded portion of the shaft 237.

When the down stroke of the plunger 230 is completed, the cam 256 releases the roller 255 and the connected collar and lever assembly 248—249, 253—254, etc. is quickly returned to its upper full line position (Fig. VIII) by a coil spring 259 which is attached at its opposite ends to the lever arms 249 and the bracket frame 194. A lighter spring 260 may also be interposed between the levers, 249 and 242, to supplement the action of the counterbalance 241 in overcoming the static friction between the sleeve 233 and its bearing 234, when the plunger is in its lowermost position, and thus assist in the initial upward movement of this member when the glass begins to rise in the sleeve 174.

The cams 214 and 256, are mounted on the shaft 200 in such phase relationship that the plunger 230 is moved downwardly, to accelerate the flow of glass from the delivery orifice 174, when the member 185 is in its raised position, and the head 188 is blocking the inlet end of the passageway 173 and thus prevents the glass in the sleeve 174 from being forced back into the sleeve 172. The full effect of the downwardly moving plunger is thus exerted in increasing the effect of the flow of molten material from the delivery orifice. To further assist in this forced expulsion or extrusion action, I provide means for compressing a certain amount of air in the space between the sleeve 174 and the plunger 230, during the downward stroke of the latter.

The air to be compressed is admitted to this space through a passageway 261, which is formed in one side of the housing 235, and which is provided with a side part 262 that is controlled by a manually operated needle valve 263. The upper end of the passageway 261 is closed by a reciprocable tubular valve 264, which is provided with a lateral opening that is adapted to register with a housing port 265 when the valve 264 is in its lowest position. The valve 264 is provided with an upward extending stem 266 which carries two adjustable collars 267—268 that are adapted to be alternately engaged by a finger 269 on the collar 243, on the upward and downward movements of the plunger shaft 237.

When the plunger is at the top of its stroke, the valve 264 is closed by the engagement of the finger 269 with the collar 267, thereby trapping a substantial volume of air within the sleeve 174; and on the next down stroke of the members 230—237 this air is compressed between the bottom of the collar 233 and the column of glass in the sleeve chamber, and thereby assists in accelerating the flow of glass through the orifice 175. As the plunger 230 nears the lower end of its stroke, the finger 269 engages the collar 268 and moves the valve 264 downwardly to connect the passageway 261 with the port 265, so that the interior of the sleeve 174 is then opened to the atmosphere, and remains open until the plunger is again raised to the upper limits of its stroke;—thus preventing any exhaust or suction action in the plunger chamber as the latter is floated upwardly by the rise of the glass in the sleeve 174. The degree of compression of the trapped air, during the positive down stroke of the members 230—234—237, can be nicely regulated by the adjustment of the needle valve 263, which controls the area of the vent passage 262.

The general mode of operation of the last-described form of apparatus is essentially the same as that of the one illustrated in Figs. I to VII, inclusive. Briefly recapitulated, it is as follows:

When the parts of the operating mechanism are in the full line position shown in Fig. VIII, the member 185 is at the lowermost limit of its downward movement—with the lower edge of the annular head 186 just clearing the adjacent upper edge of the sleeve 172—and the segregated charge of glass in the annular chamber within the head is being forced through the passageway 173 into the sleeve 174 and is moving the floating plunger 230, towards its upper position (as determined by the setting of the stop nuts 247). During the period of action, the shaft head 195 is pressed down into frictional contact with the driven ring elements 196—206—206 etc., and the member 185 is being revolved to stir the glass in contact therewith, and thus eliminate any variations or irregularities of physical condition therein. When the requisite quantity of the molten material has thus been transferred to the confined space above the delivery orifice 175 and the plunger 230 has been raised to the top of its stroke, the cam 214 releases the roller 215, and permits the weight 210 to raise the member 185 to its upper (dotted line) position; in which the connection between the passageway 173 and the chamber within the head 186 is substantially closed (by the lifting of the enlarged head 188), and the connection between this chamber and the surrounding forehearth is opened (by lifting the lower edge of the skirt 186 above the top edge of the sleeve 172). As the member 185 is raised, the rotation thereof stops due to the annular head 195 being moved out of frictional engagement with the spring elements 206 on the driven ring 196.

As soon as the member 185 has been lifted to its upper position (or in some cases, while this movement is occurring), the cam 256 acts to rock the lever link system 254—253—249 etc., on its fulcrum supports, and to thereby move the plunger assembly 246—237—230, thus exerting a supplemental downwardly extrusion or expulsion force on the glass flowing from the orifice 175;—this supplemental pressure action being accelerated, as already explained, by the regulated compression of the air above the glass in the sleeve 174. As the plunger nears the end of its downward stroke, the finger 269 engages the collar 268 and opens the valve 264 uncovering the port 265 so that the interior of the sleeve is then connected to atmosphere; and at the same time the cam 214 again comes into action to initiate the downward movement of the valve assembly 192—185—186—188, etc., and thus bring these parts into position to transfer another charge or quota of glass from the freshly filled valve chamber within the head 186 to the delivery chamber in the sleeve 174.

At the end of this down stroke the rotating cam 256 ceases to exert a pressure on the roller 255 and permits the spring 259 to quickly lift the thrust collar 248 out of engagement with the plunger rod nuts 246. This imposes an added tension on the spring 260 which will then assist the counterweight 241 in returning the freely floating plunger to its upper position. At the same time (i. e., concurrently with the lifting of the thrust collar 248), the cam 214 acts to move the valve member 185 downwardly to shut off communication between the annular chamber in the head 186 and the forehearth, and open communication between this chamber and the passageway 173. This downward movement of the member 185 exerts a preliminary expulsion force on the glass in the chamber which is supplemented, as the member 185 nears the downward limit of its travel, by the opening of the valve 222 and the admission of compressed air to the interior of the tube 192 and the passageway 216. This supplemental pressure on the glass now confined in the sleeve 172, assists the action of gravity in forcing the molten material into the plunger chamber, more rapidly than it can escape from the delivery opening 175; and as the glass rises in the sleeve 174 it "floats" the counterbalanced (or slightly overbalanced) plunger upwardly, without any accompanying retardation or arrest of the continuous outflow from the delivery orifice. When the requisite quantity of glass has thus been transferred to the interior of the sleeve 174, the downward pressure on the cam roller 215 is released and the valve member 185—186—187—188 is raised by the counterweight 210 to close the outer end of the passageway 173, and concurrently close the valve 222. The compressed air thus trapped in the interior of the upwardly moving members 192—185 etc., permits a too rapid rush of the glass from the forehearth chamber into the partially emptied sleeve 172 (see Fig. VIII); but as the upward movement continues, this residual pressure is gradually relieved in part by expansion, and in part by the slow escape of air from the small vent orifice 192a, thus permitting the chamber within the head to be completely refilled with another quota of glass. In the interval between the closure of the passage 173, and the next downward movement of the plunger 230—which may be regulated and controlled by the relative adjustment of the two cams 214 and 256—the glass will continue to flow from the orifice under the action of gravity alone, and during this interval there will be a "natural necking", or decrease in the diameter of the flowing stream, but no interruption of its continuous movement.

The stream of glass is adapted to be sheared into a succession of mold charges—preferably at some point of reduced cross section—by means of a shear mechanism which is similar in all respects to that shown in Figs. I, II, V, VI, supra, and which is operated in timed relation to the previously described elements of the feeder assembly by means of a cam actuated valve 276, in the valve box 219, that periodically connects the shear cylinder supply pipe 135—136 either to the compressed air conduit 220 or to the atmosphere. As already stated the parts of this shear mechanism are shown in Fig. VIII in the position which they occupy at an intermediate point in their return or opening movement;—the severance having in this case been effected just before the plunger has reached the end of its upward movement.

Either one of these sleeves 172 or 174 may be taken out and replaced—one from the bottom and the other from the top—by removing the corresponding plates 177 or 4a. When the sleeves 172—174 are to be changed, the flow of glass to the front end of the forehearth 1a is cut off by means of a baffle block 178 which extends through an opening in the roof of the forehearth, and is capable of being raised and lowered by turning a screw 179 which is rotatably mounted in the frame 194 extending between the posts 171 and is in threaded engagement with a cap 181 secured to the top of the gate 178.

Above the roof of the forehearth, angles 182 are adjustably clamped to the gate 178 on each side thereof which support the weight of the gate on the roof of the forehearth. By positioning a suitable insulating material between the bottom of the forehearth and the angle 182, as at 183, which is compressed by the weight of the gate, a seal is secured which prevents the heat in the forehearth from escaping around the sides of the gate.

In Fig. IX, I have shown another exemplification of my invention in which a swinging gate is employed to control the flow of glass from the forehearth to the segregation chamber above the flow orifice. In this construction, the molten glass is contained in forehearth 280 which is connected in the usual manner with the front end of a larger tank furnace, and which is provided at its outer extremity with a sub-forehearth 280a that extends a substantial distance below the bottom of the main forehearth, and is detachably secured to the bottom floor plate thereof by the bolts 280b. The interior of the sub-forehearth is cut off from the main forehearth chamber by a hollow refractory member 281, which is seated on a shoulder in the floor of the upper chamber and is held down against the latter by the removable roof plates (4b). The hollow member 281 is preferably of oval or elliptical cross section, and is divided, by the partition wall 282, into two chambers 283 and 284 which will be hereinafter respectively referred to as the charging chamber and segregation chamber. The charging chamber 283 communicates with the forehearth through a port 285 in the wall of the member 281, and with the segregation chamber 284 through a port 286 formed in the bottom of the partition wall 282. The lower end of the segregation chamber 284 is in open and constant communication with a flow orifice 287 formed in a flow bushing 288 which is removably mounted in the lower end of the member 281.

The flow of glass from the forehearth 280 into the charging chamber 283, and from the charging chamber into the segregation chamber 284, is controlled by a swinging gate valve 289 which is mounted in the chamber 283, and which is adapted to open the port 285 and close the port 286 when at one end of its travel and to close the port 285 and open the port 286 when at the other end of its travel.

The gate 289 is made of a suitable refractory material, and is supported on a tapered rod 290 which is embedded in the body of the gate and is threadedly connected at its upper end to a larger rod 291 that passes through a trunnion shaft 292 extending transversely of the gate and journaled at each end in suitable bearings. The upper end of the rod 291 extends upwardly into a closed casing 293, made of a suitable heat resisting alloy, which is mounted on the roof of the forehearth and forms the upper part of the chamber 283. The gate 289 is normally held in the full line position of Fig. IX—to close the port 286 and open the port 285—by a coil spring 294 disposed between the top of the rod 291 and the casing 293; and it is periodically rocked on its trunnion supports, (to close the port 285 and open the port 286) by a cam 295, which is adjustably secured to a continuously driven shaft 296 and which is engaged by a roller 297 carried on the upper end of the rod 291.

When the gate 289 is in position (Fig. IX) to close the port 286 and open the port 285, molten glass flows from the forehearth into the charging chamber 283. In this stage of the operation it is desirable to raise the level of the glass in the chamber 283 above the level of the glass in the forehearth; and in order to effect this result, the upper part of this chamber is, at this time, connected to a vacuum or suction box 300, by means of a rotating cylindrical valve 298 which is mounted on the cam shaft 296 and which is provided with a peripheral segmental groove that is in registry with a passage 299 (see dotted lines) formed in the side of the casing 293 and leading to the suction box 300.

The box 300 is provided with an exhaust pipe 301 which leads to a suitable source of subatmospheric pressure and which is controlled by a valve 302 that is normally held in its closed position by a spring 303, and is periodically opened by a suitable cam (see dotted lines) on the cam shaft 296. The relative positions of this cam and of the rotating valve 298 are so adjusted that the valve 302 is closed just before the passage 299 is opened and is opened just after the passage is closed (as shown in Fig. IX).

When communication is established between the chambers 300 and 283, the pressure in the latter will drop and the glass will rise therein until the pressures in the connected chambers have become equalized; and when this occurs, the further flow into the charging chamber will be arrested and the molten material will stand at a head or level—above the glass in the surrounding forehearth—which corresponds to this reduced (equalized) pressure.

In order to vary the capacity of the suction chamber 300, and thereby control the vacuum to which the glass in the chamber 283 is finally subjected, an adjustable sylphon bellows 305 is mounted within the chamber 300. This bellows 305 is capable of being expanded or contracted, to vary the capacity of the chamber 300, by means of a screw 306 which is riveted to the inner closed head of the bellows and which is engaged by a rotatable nut 307 that is, in turn, threaded through a central boss 308 on the outer head which covers the chamber 300. The threads on the inner surface of the nut 307—which engage the screw 306—are of different pitch than the threads on its outer surface (which engage the boss 308); and when the nut is turned, the closed head of the bellows is moved outwardly or inwardly with respect to the surrounding chamber casing, thereby varying the desired capacity of the chamber 300. By thus establishing a predetermined relationship between the internal volume of the vacuum chamber and the initial volume of the charging chamber 283 it is apparent that the glass in the latter will be periodically subjected to a final predetermined vacuum which will lift the glass therein to any desired height above the surrounding glass in the forehearth, but which can never act to lift the molten material to the level of the trunnion supports 292. In order to establish and maintain a predetermined initial vacuum in the suction box 300—when the valve 302 is opened—a "vacuum breaker", or relief valve 309 is mounted in the wall of the chamber 300; and is adjusted to momentarily open to the atmosphere when the pressure in the chamber drops below the predetermined value.

After the glass has been raised to the preadjusted level in the chamber 283, the cam 295 moves the swinging gate 289 to the right, thus throttling and substantially closing the port 285 and opening the port 286 leading to the segregation chamber 284. The glass in the charging chamber will then flow rapidly into the space above the delivery orifice 287 under the action of gravity, alone; but in order to accelerate this natural flow, a suitable fluid under super-atmospheric pressure may at this time be introduced into the upper portion of the casing 293. This fluid is introduced through a passageway 311 which is connected to a pipe 312 that leads to a suitable source of such fluid. The time of its admission to the charging chamber is controlled by a valve 313, in the passageway 311, which is normally held in its closed position by the pressure of the fluid on its outer face, and which is opened by the engagement of its stem 314 with the cam roller 297, when the latter is moved to the left under the action of the cam 295.

The glass which flows from the charging chamber 283 through the wide open port 286 will enter the segregation chamber 284, more rapidly than it can escape therefrom through the restricted orifice 287; and as a consequence, it will rise quickly in the chamber 284; and will in its upward movement carry with it a "floating" plunger member 316 which is reciprocably mounted therein. The plunger 316 is supported on a rod 317 which is secured at its upper end to a refractory metal cap 318 (of nichrome or Fahrite or other suitable alloy) that is slidably mounted in a graphite bearing 319 carried by a side extension, 320, of the casing 293. The upper end of cap 318 is connected to a hollow rod 321 which extends upwardly through a cylindrical member 323 and is slidably engaged by a tubular screw 322 mounted in the upper head of the cylinder. The lower part of the rod 321 is externally threaded to receive a pair of adjustable lock nuts 321a, which are adapted to engage the upper end of the housing extension 320 and thus limit the downward movement of the plunger assembly 316—321; and it also carries a loose collar 324, which engages the lower face of a third nut, i. e., thrust ring 321b on this vertically reciprocable member. The collar 324 is provided with a pair of pivot pins 325 that engage the outer ends of a bifurcated lever 326 which corresponds in function to the levers 73 and 242 of Figs. I and VIII, and which carries a suitable weight (not shown) that is sufficient to counterbalance the plunger assembly and overcome the static friction between the reciprocable members 318—321 and their bearing elements 319 and 322. The upper portion of the rod 321 which extends through the cylinder 323, is of reduced cross section and is slidably engaged by a piston 328 that is reciprocably mounted in the cylinder 323. The piston is normally held in the full raised position by a nested series of coil springs 329 which are interposed between the lower face of the piston 328 and an inwardly projecting flange on the bottom of the cylinder 323. These springs will normally hold the piston 328 in its upper dotted line portion of Fig. IX, and will thus leave the counterbalanced plunger assembly free to "float" upwardly with the glass as it rises in the segregation chamber 284, until the shoulder 321c on the rod 321 is in engagement with the bottom of the piston 328. When the plunger has been thus raised by the transfer of glass from the chamber 283 to the chamber 284, the cam 295 releases its pressure on the roller 297 and permits the spring 294 to swing the gate valve 289 to its initial full line position (Fig. IX) thereby closing the port opening 296, and preventing any material flow of glass therethrough at the same time—or immediately thereafter—fluid under pressure is admitted to the upper end of the cylinder 323, through the communicating passageway and pipe connections 330—331, which are controlled by a needle valve 333 that is normally held in its closed position by a spring 334, and is periodically opened by the engagement of its stem with a cam (not shown) on the cam shaft 296. The valve 333 is similar in construction to the valve 83 shown in Fig. I; and is so constructed that when it is raised, it first closes a port 337 which normally connects the upper end of the cylinder 323 to the atmosphere, and then allows the motive fluid to pass from the conduit 312 to the space above the piston, and force it, and the associated plunger assembly 316—321, etc., downwardly;—thus applying a supplemental extrusion force to the glass in the chamber 284, which accelerates the flow through the orifice 287, and stuffs the stream issuing therefrom.

The metal cap 318 is of slightly larger diameter than the plunger 316 and therefore acts as an annular piston, which tends to alternately compress and rarefy the air in the segregation chamber as the piston cap moves up and down in its guide sleeve (cylinder) 319. In order to prevent any material drop in pressure in the chamber 284, when the plunger is being floated to its upper position, the latter is provided with a passageway 338 which communicates with the interior of the rod 321 through a port 329 in the cap 318. The passageway in the rod 321 is normally closed by a spring controlled check valve 340 which is adapted to automatically open and connect the chamber 284 to atmosphere when the pressure therein drops below a predetermined level.

The portion of the oval member 281 which projects down into the sub-forehearth—together with the glass contained therein—is maintained at any desired working temperature by a suitable heating element such as an electrical heating coil 341 which is connected to a suitable source of current by the insulated leads 342—343.

In Figs. X to XIV, inclusive, I have illustrated another exemplification of my uni-directional plunger feeder, and an alternative form of a dropping shear mechanism, for severing the flowing stream of glass into mold charges. In this construction, the molten glass to be fed is contained in a forehearth 350, which is connected to the front end of a suitable melting furnace or tank and is supported, in part, by the upright posts 351. The forehearth 350 terminates, at its outer end, in a sub-forehearth 352 which extends a substantial distance below the bottom of the main forehearth, and which is provided with a removable floor block 353 that serves to support an upwardly extending hollow refractory member 354, and to hold it in position against the roof of the main forehearth and also against the bottom and side faces of the floor blocks 355—355 thereof (see Figs. X and XI). The coengaged members 354—355—355 together form a dam, which extends above the normal level of the molten glass in the forehearth 350, and prevents it from flowing down into the sub-forehearth space around the member 354.

The tubular member 354 is provided with a removable inner sleeve 356 whose external diameter is less than the internal diameter of the said member, and which serves to divide the lower portion of the enclosed space into an annular passageway 357 and a segregation chamber 358. The glass in the forehearth flows by gravity through a pair of radially disposed ports 359—359, in the wall of the member 354 into the upper end of the passageway 357, and thence, through a plurality of ports 360 in the bottom of the sleeve 356, into the segregation chamber 358. The floor block 353, which supports the tubular member 354, is provided with a central opening, which is partially closed by an independently removable flow ring bushing 362 that defines the shape and size of the delivery orifice 361. The cross sectional area of the passageway 357 and of the ports 359 and 360 is substantially greater than that of the delivery orifice 361; and as a consequence of this, the glass will be delivered to the segregation chamber 358 at a more rapid rate than it can escape from the delivery orifice, and will, therefore, "back up" or rise rapidly in this chamber, as soon as it is put in communication with the parent body of molten material in the main forehearth.

This flow of glass from the forehearth 350 through the ports 359, etc., is controlled by a reciprocably mounted gate 363, which extends upwardly through an opening in the roof of the forehearth 350, and which is suspended on a rod 364 that is bolted to a metallic cap sleeve 365, engaging the upper end of the gate 363. The sleeve 365 is made of nichrome or some other suitable high heat resisting alloy, and is slidably mounted in a graphite bearing 366 that is carried by a housing 367, on the roof plate of the forehearth 350. The upper end of the cap member 365 is detachably connected, through coupling 368, to the lower end of a rod 369, which extends upwardly through a guide bearing 370 that is carried by a U-shaped bracket support 371 mounted on the upright posts 351. The upper end of the rod 369 is flexibly coupled to the outer forked extremity of a lever 373 which is pivotally mounted on the head of the bracket 371, and is periodically rocked on its pivot support— to raise and lower the gate 363—by means of a cam 375, on a cam shaft 376, which is operatively connected to a suitable motor (not shown) by the worm wheel and worm gear elements 377—378, and the vertical shaft 379. The cam 375 engages with a roller 374 on the lever 373, and is so shaped and adjusted as to periodically raise the connected lever-gate assembly 373—369—363—to open the ports 359—and then allow it to descend under its own weight, to close these ports.

When the gate 363 is in its raised position, the molten material in the forehearth 350 flows into the annular passageway 357, and through the ports 360, and rapidly rises in the segregation chamber 358 (for the reason already explained). As the molten material rises in the segregation chamber 358, it carries up with it, a "floating" plunger 380, which is of smaller diameter than the interior of the sleeve 356, and which is supported on a rod 381 that is secured, at its upper end, to a refractory metal cap sleeve 382.

The cap member extends upwardly through a suitable graphite guide bearing 383, that is mounted in the housing 367, and is detachably connected at its top, through coupling 384, to the adjacent extremity of a rod 385, which is slidably engaged with an upper guide bearing 386 on the bracket support 371. The rod 385 carries a split collar 390, which can be adjusted up and down thereon, and clamped thereto at any desired point, and which is pivotally connected to the outer ends of a bifurcated lever 389, that is fulcrumed, at an intermediate point in its length on a cross bolt 391, and is provided with a rearwardly extended member 388, which carries a counterbalance weight 387. This weight is so adjusted as to balance—or slightly overbalance—the suspended plunger assembly, and also overcome the static frictional resistance to the movement thereof; and in order to periodically move the plunger downwardly, to accelerate the flow from the delivery orifice 361, the lever 389 is provided with a roller 395 which is rotatably mounted between its bifurcated arms, and which is engaged by a cam 396 on the cam shaft 376. The cam 396 is so adjusted with respect to the cam 375, that it begins to move the arm 389, and the plunger rod 385 and plunger 380, downwardly, concurrently with, or immediately after, the cam 375 has permitted the gate 363 to descend by its own weight, and thereby close the supply ports 359.

In order to change the range of plunger movement, the fulcrum bolt 391 in which the lever 389 is pivotally supported, is adjustably mounted in slots 392—393 in the lever 389 and side walls of the U-shaped bracket frame 371—371; and by moving this fulcrum bolt to different positions in these slots the angular throw of the lever, under the action of the cam 396, may be readily varied. As already explained, the upper and lower limits of the plunger movement may also be regulated by shifting the position of the split collar 390 on the plunger rod 385.

The downward movement of the cap sleeve 382 in its guide bushing 383 compresses the air in the upper annular space between the tubular member 354 and the descending plunger, and thus supplements the mechanical extrusion pressure exerted on the glass in the segregation chamber during this phase of the delivery cycle. In order to prevent any reverse suction effect, due to a rarefaction of the trapped air, during the subsequent lifting of the floating member 380, the housing 367 is provided with a passageway 397, which leads from the upper end of the chamber 358 to the outside air, and which is normally closed by a light spring balanced check valve 398, that will automatically open whenever the pressure beneath it drops below that of the atmosphere.

In order to maintain the glass in the chambers 357 and 358, at the desired working temperatures, a combustible fuel is introduced into the sub-forehearth chamber through a plurality of burner nozzles, 399—400 which are preferably arranged in pairs on opposite sides of the sub-forehearth, and which are so set as to establish and maintain a tangential or circumferential flow of the gases of combustion around the periphery of the member 354. The lower pair of burners 399—399, which are positioned in the openings 401, are so inclined as to set-up a rotational movement of the burning gases in a counterclockwise direction (see Fig. XII); and the upper pair of burners 400—400—which are positioned in the openings 401a—are reversely inclined (as shown by the dotted lines of Fig. XI) so as to obtain an opposite clockwise movement of the gases in the upper part of the combustion chamber. After passing around the lower portion of the oval tubular member 354, the mixed streams of burned gases, pass upwardly and backwardly around the sides of this member and the edges of the gate 363, into the main forehearth, and thence into the main tank chamber.

The cyclic operation of this last-described form of mechanism differs in no essential respect from that which characterizes the constructions shown in Figs. I to IX, inclusive; and does not for that reason require any extended explanation. When the gate 363 is raised to its upper position, the molten material in the main forehearth flows by gravity into the chamber 358, and rapidly rises therein to a level that is usually somewhat less than that of the parent body of glass in the forehearth chamber. The rising column of glass "floats" the balanced plunger assembly to its upper position, and as soon as this has been reached the cam 375 releases the supporting elements of the gate 363, and permits the latter to descend and cover the ports 359, thus arresting any further flow of glass to the segregation chamber 358. The cam 396 then comes into action to depress the lever member 389 and move the plunger 380 downwardly in the chamber 358, thereby accelerating the flow of glass through the delivery orifice 361, expanding or swelling the stream issuing therefrom. When the plunger 380 has reached the lower predetermined limit of its travel, the cam 396 releases its pressure on the cam roller 395, and the cam 375 again comes into action to lift the lever 373 and the gate 363 connected thereto, thus re-establishing a flow of glass from the forehearth into chamber 358 and initiating another cycle of the feeding operation.

As a result of having the flow orifice 361 located at a substantial distance below the bottom of the main forehearth, a static head of molten material is maintained in the annular chamber 357, which insures the rapid filling of the chamber 358 when the ports 359 are opened; and also insures a continuous high speed gravity flow of glass through the orifice 361. This continuous gravity flow of the material from the orifice is accelerated on the downward strokes of the plunger; and as a result of this action, the oncoming stream is periodically swelled or expanded, to produce, a regularly recurrent series of alternately enlarged and reduced stream sections, which are adapted to be severed—preferably at the points of reduced section—into a succession of individual preformed mold charges, of any desired shape and volume.

In order to sever the stream at the points of reduced cross section, without interfering with or retarding the continuously flowing stream, I provide a shear mechanism which is adapted to travel with the stream during the severing operation. The shear mechanism shown in Figs. X to XIV, inclusive, comprises a pair of opposed shear blades 405—405 that are mounted on plates 406—406, each of which is pivotally supported on a pair of parallel crank arms or links 409—409a which are secured to parallel cross shafts 410—410a. These cross shafts 410—410a are journaled in the sides of a box shaped frame 411 that is suitably suspended from the floor of the sub-forehearth 352 (e. g., in the manner illustrated in Figs. I, V, and VIII), and are each provided, at their outer ends with a pair of miter gears 412—412a which are engaged with corresponding sets of gears 413—413a that are secured to the side shafts 414 and 414a. These side shafts 414—414a are journaled in bosses 415—415a projecting outwardly from the side frame 411, and are connected to revolve in opposite directions by the spur gears 421—422. One of these gears 421 is secured to an elliptical gear 420, that is engaged by a companion gear 419, which is rigidly attached to the side of a larger worm wheel 416, and which is mounted to revolve freely on the adjacent end bearing of the side shaft 414. The worm wheel 416 is continuously revolved, at a substantially uniform speed, by a worm 418 on the motor shaft 379; and thus uniform angular velocity of the connected gear elements 418—416 is varied, by the elliptical gears 419—420, into an alternately accelerated and decelerated movement of the side shafts 414—414a.

When the apparatus is in operation, the crank arms 409—409a, carrying the shear blade supports 406, are continuously rotated; and the cutting elements are symmetrically moved toward and away from each other in parallel planes; and are also alternately moved downward and upward during successive half revolutions of the shafts 414—414a. The elliptical gears 419—420 are so arranged that the greatest velocity is imparted to the shafts 414—414a at the time when the shear blades are cutting through the flowing material; and at this time the shear blades are also travelling downwardly at their maximum speed, which is preferably greater than the movement of the particles of molten material.

The foregoing description of various alternative embodiments of my invention will make it apparent that I have provided a number of equivalent forms of forced flow feeders of the reciprocating plunger type, in which the plunger applies a force to the glass when moved in one direction only; and exerts no retarding or retractive effect on the continued flow through the delivery orifice when the plunger is moving in the opposite direction. The rate of outflow of molten material from the orifice is, variable in amount because it is periodically accelerated by the application of a supplemental extruding force which complements the action of gravity in forming a succession of enlarged stream sections; but the portions of lesser diameter which connect these enlarged sections are not produced by any retractive or retardant force, such as is essential in the operation of the ordinary sticky plunger type of feeder where the plunger is positively lifted, but are only the result of a "natural necking" in the glass which is caused by the decreased speed of gravity flow between the times of the forced or accelerated flow.

With my improved feeder, therefore, there is a continuous or uninterrupted discharge of glass from the delivery orifice; and there is no loss of time between the formation of successive mold charges or any chilling, or other detrimental change in the physical character, of the molten material because of such interruptions. As a consequence of this, I am able to produce a succession of such preformed mold charges at a much higher speed than is possible with the ordinary types of plunger and air feeders now in general use; and I am also enabled to deliver these charges to the mold receptacles in better condition than is feasible when the movement of the material is discontinuous, and is, therefore, intermittently subjected to localized cooling, or surface distortion.

With the increased speed of operation which is characteristic of the present invention, the continuously flowing stream of molten material must be cut in such a way as to avoid "piling up" of the material on the shear blades; and I avoid any such action by moving the shear blades downwardly with the stream during the severing operation. To prevent any distortion of the severed stub, I retract the shear blades when they are in their lowermost position—or when they are still moving downwardly—so that they cannot interfere with the oncoming stream of glass, and with the formation of the next mold charge. This downward movement of the shear blades with the stream during the cutting operation will in fact tend to assist the oncoming flow, and to also accelerate the delivery of the severed gob to the mold of the forming machine.

It will be observed that in each and all of the hereinbefore described forms of apparatus provision has been made for a wide range and variety of adjustments, which will enable the operator of one of these feeders to vary the relative magnitudes and times of application of the supplemental extrusion forces—and thereby obtain a correspondingly wide range of preformed stream sections, which are best adapted to furnish the desired weight and shape of mold charges for subsequent fabrication in the forming machine—and that their adjustments may be made while the feeder is in operation (for the purpose of maintaining either the weight or shape of the successively severed stream sections), without interrupting the continuous flow of the molten material from the delivery orifice.

It will also be noted that all of the structural assemblies herein shown, are so designed that the parts most subjected to deterioration or injury may be readily removed, replaced, and readjusted, without any great loss of time; and that occasional necessary repairs and replacements of this character do not necessitate the disassembly of any great number of the forehearth and feeder elements, or the exposure of the workmen to any unusual dangers or discomforts during such operations.

With the preceding disclosure as a guide, those skilled in this art will be enabled to recognize and appreciate other advantages of the present invention, which may not have been specifically pointed out; and will be able to derive various other forms of apparatus that might be used to practice my improved mode of procedure, without departing from the spirit of my invention or the scope of the appended claims.

What I claim as new and desire to secure by Letters Patent is:

1. A method of forming mold charges of plastic material such as molten glass, which comprises maintaining a parent body of such material at a degree of plasticity to ensure flow under a relatively small gravity head, delivering material in the form of a suspended stream and building up a supplemental supply of such material by flowing material from said parent body toward a flow orifice at a rate greater than it can flow through the orifice under the gravity head encountered, periodically segregating from the parent body the flowing material and the supplemental supply, moving an implement toward said orifice to expel said segregated material therethrough, reestablishing such flow from the parent body toward such orifice to build up another supplemental supply and float said implement away from said orifice, and severing a mold charge from the suspended stream issuing from such orifice.

2. A method of forming mold charges of plastic material such as glass, which consists in maintaining a parent body of such material at a degree of plasticity such that it will flow under a relatively low gravity head, segregating a quota of material from such body, moving such quota under pressure toward a flow orifice at a rate greater than it can flow through the orifice at the pressure employed, and building up a supplemental supply of such material in communication with such orifice, floating an implement on said supplemental supply, expelling material from said supplemental supply through such orifice by moving said implement toward said orifice while segregating an additional quota from the parent body and while preventing a flow away from said orifice, and then in severing a charge from the stream issuing from such orifice.

3. A method of forming mold charges of plastic material such as molten glass, which consists in maintaining a parent body of such material at the desired degree of plasticity, delivering material from such body through a flow orifice in the form of a suspended stream while building up a supplemental supply of such material in communication with such orifice, periodically segregating from the parent body the material moving toward said orifice, moving a normally floating implement toward said orifice to expel said supplemental supply, reestablishing a flow from said parent body through said orifice to build up another supplemental supply and float said implement away from said orifice, and then in severing a charge from the stream issuing from the orifice.

4. A feeder apparatus comprising a container for molten material, a collecting chamber associated therewith, a supplemental supply chamber communicating with said collecting chamber and having a flow orifice formed therein, means for controlling communication between said collecting chamber and said container, and a counterbalanced reciprocable implement for forcing material in said supply chamber through the orifice, said implement being adapted to be floated by the material in said supply chamber to its upper position and being positively moved to its lower position to force the material through the orifice.

5. A feeder for plastic material such as molten glass, comprising a container for such material, a supplemental supply chamber having a flow orifice communicating therewith, a collecting chamber between said supply chamber and said container, means for establishing and cutting off communication between said collecting chamber and said container, a counterbalanced implement extending into and floating on the material in said supply chamber and means for periodically moving said implement toward the orifice to force the material contained therein through said orifice.

6. A feeder for plastic material such as molten glass, comprising a container for such material, a collecting chamber, a secondary chamber communicating therewith and provided with a delivery orifice, reciprocal means for establishing and cutting off communication between said container and said collecting chamber, a balanced plunger normally floating on the material within said secondary chamber, and means for positively moving said plunger to expel material through said orifice while said collecting chamber is cut off from said secondary chamber.

7. A feeder for plastic material such as molten glass comprising a container for such material, a collecting chamber, a secondary chamber communicating therewith and having a flow orifice therein, reciprocable means for periodically establishing communication between said collecting chamber and said container and shutting off communication between said collecting and said secondary chamber, a plunger for expelling material from said secondary chamber through said orifice, means for periodically moving said plunger toward said orifice, and means associated with said plunger whereby it may be floated away from said orifice.

8. A feeder for plastic material such as molten glass, comprising a container for such material, a segregation chamber having a flow orifice communicating therewith, a collecting chamber, means for simultaneously closing communication between said collecting chamber and said segregation chamber and establishing communication between said collecting chamber and said container, and means associated with said segregation chamber for expelling material therefrom and through said orifice, including a counterbalanced implement adapted to be positively moved in one direction and floated by the material in the opposite direction.

9. A feeder for plastic material such as molten glass, comprising a container for such material, a chamber having a flow orifice formed in the bottom thereof, and adapted to receive material from said container, a plunger located within said chamber and projecting into the material contained therein, means for counterbalancing the weight of said plunger so that it normally floats on such material, and means for positively moving said plunger in one direction only whereby the plunger is moved toward the orifice to expel the material from said chamber through said orifice, and floated in the opposite direction to prevent any retraction of the glass at the orifice.

10. A feeder for plastic material such as molten glass, comprising a container for such material, a chamber having a flow orifice communicating therewith, a plunger within said chamber, means for normally balancing the weight of said plunger whereby it is buoyed up by the material within said chamber, means for controlling the delivery of material from said container to said chamber, and means for over-balancing said plunger during periods of delivery from said container to said chamber to move it toward said orifice to expel the material therethrough.

11. A feeder for plastic material comprising a container having a collection chamber and a delivery chamber in communication with each other, the collection chamber opening into said container and the delivery chamber communicating with a delivery orifice, a valve for alternately controlling the flow from said container into said collection chamber and from said collection chamber into said delivery chamber, means for operating said valve, an implement floatable on the material in said delivery chamber, means for transferring the material from the collection chamber to the delivery chamber, and means for periodically forcing said implement toward said orifice to discharge material in said delivery chamber.

12. A feeder for plastic material comprising a container having communicating, collection, and delivery chambers therein, the collection chamber opening into the material in said container and the delivery chamber communicating with a delivery orifice, a reciprocable valve for alternately shutting off the flow from the container to said collection chamber and from said collection chamber to said delivery chamber, means for periodically reciprocating said valve, means operable when said valve is in position to shut off the flow from said container to said collection chamber for applying pressure to the material in said collection chamber to transfer it to the delivery chamber, and means operable when the communication between said chambers is cut off for expelling the material in the delivery chamber through the orifice.

13. A feeder for plastic material comprising a container having a delivery orifice and communicating, collection, and delivery chambers therein, the collection chamber opening into the material in said container and the delivery chamber communicating with the delivery orifice, a reciprocable valve for alternately shutting off the flow from the container to said collection chamber and from said collection chamber to said delivery chamber, means for periodically reciprocating said valve, means operable when said valve is in position to shut off the flow from said container to said collection chamber for applying pressure to the material in said collection chamber to transfer it to the delivery chamber, and a movable plunger within _said delivery chamber, said plunger being mechanically movable in one direction and floatable in the opposite direction.

14. A feeder for plastic material comprising a container having a delivery orifice and communicating, collection, and delivery chambers therein, the collection chamber opening into the material in said container and the delivery chamber communicating with the delivery orifice, a reciprocable valve for alternately shutting off the flow from the container to said collection chamber and from said collection chamber to said delivery chamber, means for periodically reciprocating said valve, means operable when said valve is in position to shut off the flow from said container to said collection chamber for applying pressure to the material in said collection chamber to transfer it to the delivery chamber, a balanced plunger floatable on the material within said delivery chamber, and mechanical means imparting downward movement to said plunger to expel the material through said orifice, said plunger being floated to its upper position each time material is transferred from the collection to the delivery chamber.

15. A feeder for plastic material comprising a container having a delivery orifice and communicating, collecting and delivery chambers therein, the collecting chamber opening into said container and the delivery chamber communicating with the delivery orifice, a reciprocable valve for alternately shutting off the flow from the container to said collecting chamber and from said collecting chamber to said delivery chamber, means for periodically reciprocating said valve, means for rotating said valve when in its raised position to stir the glass in said container, and means operable when said valve is in its lower position for forcing the material from said collecting chamber into said delivery chamber.

16. A feeder for plastic material comprising a container having a delivery orifice and communicating, collecting, and delivery chambers therein, the collecting chamber opening into said container and the delivery chamber communicating with the delivery orifice, a valve for alternately controlling the flow from said container into said collecting chamber and from said collecting chamber into said delivery chamber, means operable when said valve is in position to shut off the flow from the container to said collecting chamber for applying pressure to the material in said collecting chamber to transfer it to the delivery chamber, and means operable when the valve is in its other position for expelling the material in the delivery chamber through the orifice.

17. A feeder for plastic material comprising a container for such material having a submerged orifice therein, a mechanically counter-balanced implement projecting into said container in vertical alignment with said orifice and adapted to float on the material therein, and means for periodically moving said implement in one direction only and toward the orifice to augment the flow therethrough, said means being adapted to disengage said implement as soon as the implement has been moved into close proximity to the orifice, whereby the glass in the container floats the implement away from the orifice and prevents any retarding of the flow through the orifice.

18. A method of forming mold charges of plastic material such as molten glass which consists in maintaining a parent body of such material at a degree of plasticity such that it will flow under a relative small gravity head, delivering material in the form of a suspended stream and building up a supplemental supply of such material by moving material from said parent body toward a flow orifice at a rate greater than it can traverse the orifice under the existing gravity head, segregating the supplemental supply from the parent body, expelling the supplemental supply through the orifice while so segregated by moving an implement toward the orifice, reestablishing the supplemental supply by delivering glass from the parent body under sufficient pressure to float the implement away from the orifice, and severing a mold charge from the suspended stream issuing from such orifice.

19. A method of feeding molten glass through an orifice which consists in delivering a quantity of glass to the orifice from a body of such material, periodically moving an implement toward the orifice to apply an expelling force to the glass delivered to the orifice, and then delivering another quantity of glass from the body to the orifice under sufficient pressure to float the implement away from the orifice.

20. A method of feeding molten glass in a suspended stream through a flow orifice, which consists in maintaining a parent body of such material, delivering material from the body to the orifice at a rate greater than it can be discharged therethrough, periodically moving an implement toward the orifice to expel the excess material therethrough while preventing a reversal of flow to the parent body and then delivering another quantity of glass from the parent body to the orifice under sufficient pressure to float the implement away from the orifice to prevent the exertion of a retracting effect on the molten material over the orifice.

21. A feeder for plastic material comprising a forehearth for such material having an orifice in the bottom thereof, a sleeve in said forehearth having its interior in communication with said orifice and with the interior of said forehearth, a counterbalanced plunger mounted in said sleeve and normally floating on the material within said sleeve, and, means for periodically depressing said plunger to move it toward said orifice and expel the glass in the sleeve through said orifice, said plunger being adapted to be floated away from said orifice by the flow of glass from said forehearth into said sleeve at the completion of each depressing movement thereof.

22. A feeder for plastic material comprising a forehearth for such material having an orifice in the bottom thereof, a hollow member in said forehearth having its interior in communication with said orifice and with the interior of said forehearth whereby glass flows from the forehearth into said member and through said orifice, a plunger movably mounted in said hollow member, means for periodically applying a depressing force to said plunger to move it toward the orifice and discharge the glass in said member through the orifice, and means for counterbalancing the weight of said plunger whereby the flow of glass from said forehearth into said member is utilized to move said plunger away from said orifice.

23. The method of feeding molten glass which consists in establishing a flow of molten glass from a supply body to an orifice at a faster rate than it can flow therethrough under the existing gravity head, periodically accelerating the flow through the orifice by moving an implement toward the orifice while cutting off the flow from the supply body to the orifice, and then reestablishing the flow from the supply body to the orifice and utilizing the flow to move the implement away from the orifice.

24. The method of feeding molten glass from a supply body of such material which consists in delivering glass from said supply body to a flow orifice at a faster rate than it can flow through the orifice under the existing gravity head, accumulating a quota of glass over the orifice from the excess glass delivered thereto, periodically augmenting the flow through the orifice by moving an implement toward the orifice to discharge a portion of the accumulated quota therethrough, and then floating the implement away from the orifice to prevent any retarding of flow therethrough by accumulating another quota of glass above said orifice.

FRANK L. O. WADSWORTH.